United States Patent Office 3,645,955
Patented Feb. 29, 1972

3,645,955
PLASTICIZED, RADIOPAQUE VINYL RESIN COMPOSITIONS
Vincent J. Flynn, Tenafly, N.J., assignor to Scientific Tube Products, Inc., Englewood, N.J.
No Drawing. Continuation-in-part of application Ser. No. 826,778, May 6, 1969, which is a continuation-in-part of application Ser. No. 571,592, Aug. 10, 1966, now abandoned, which in turn is a continuation-in-part of application Ser. No. 518,186, Jan. 3, 1966, now abandoned. This application Mar. 18, 1970, Ser. No. 20,792
Int. Cl. C08f 45/40, 45/42
U.S. Cl. 260—31.4                                29 Claims

ABSTRACT OF THE DISCLOSURE

Novel plasticized, radiopaque compositions are provided by formulating vinyl resins with alkyl 2,5-diiodobenzoates, alkyl or alkoxyalkyl 2,3,4,6-tetraiodobenzoates (I), or mixtures thereof. The compositions are useful in the manufacture of X-ray opaque medical devices, particularly surgical tubing. The new compositions have improved radiopacity, lighter color and smoother surfaces after extrusion. When used singly or together, they have a wide range of flexibility and stiffness. Surgical tubing is provided in a wide range of sizes with properties essential to cardiovascular and ureteral catheterization techniques. The compositions are used also in tubing for stomach, nasal and thoracic catheters.

CROSS-REFERENCE TO RELATED APPLICATIONS

This application is a continuation-in-part of copending prior application Ser. No. 826,778, filed May 6, 1969, which is a continuation-in-part of prior application Ser. No. 571,592, filed Aug. 10, 1966, now abandoned, which in turn is a continuation-in-part of prior application Ser. No. 518,186, filed Jan. 3, 1966, now abandoned.

This invention relates to novel plasticized and radiopaque resin compositions and shaped articles prepared therefrom. More particularly, this invention pertains to compositions of vinyl resins and polyiodobenzoic acid esters and their use in medical-surgical devices.

BACKGROUND OF THE INVENTION

In U.S. 3,361,700, in which the applicant is a co-inventor, a family of alkoxyalkyl esters of diiodobenzoic acid are disclosed to be radiopaque and useful as plasticizers for compatible resins, such as polyvinyl chloride.

The plasticized compositions prepared according to the patent are suitable for medical use, e.g., in the manufacture of catheters and similar products. Because the compositions are radiopaque, i.e., opaque to X-rays, surgical products prepared from them can be readily visualized by fluoroscopic devices or in X-ray photographs. This facilitates insertion, observation during use and the location of broken fragments.

Radiopaque compositions are employed to make sheeting for location and protection purposes, surgeon's gloves and prosthetic appliances, but they are most widely used in surgical tubing. Such surgical tubing is used in heart catheters, vein intubation catheters, ureteral catheters, feeding tubes, stomach and thoracic catheters, and the like.

In the said patent it is disclosed that the diiodinated esters uniquely serve a dual purpose, both as radiopacifiers and as plasticizers. It is further disclosed that the corresponding monoiodinated esters are substantially less effective as radiopacifiers and plasticizers and that the corresponding triiodinated esters are inoperative as plasticizers.

While the alkoxyalkyl diiodobenzoates of U.S. 3,361,700 have provided certain improvements over previously used radiopaque fillers and pigments, they have been found to be less than entirely satisfactory in vinyl resins. A major problem in the use of the alkoxyalkyl diiodobenzoates is the difficulty in achieving a sufficiently high iodine content in the resin composition, and at the same time avoiding overplasticization. For covering the whole field of catheter applications a wide range of flexibility and stiffness is required in the many sizes used.

The commercial embodiment of the family of alkoxyalkyl diiodobenzoates is 2-ethoxyethyl 2,5-diiodobenzoate. This compound has a high plasticizer value in relation to its iodine content. However, to obtain adequate stiffness and rigidity for ureteral catheters and heart catheters, compositions may not contain more than about 25–30% by weight of the 2,5-diiodoester. Such compositions contain only about 12.5 to 15% of iodine. This is not an adequate quantity of iodine for detecting a small broken off section in the smaller sizes of in-dwelling intubation sets or if the tapered tip is lost in the venous system. On the other hand, to increase the quantity of the 2,5-diiodoester to achieve increased opacity results in tubing which is too flexible to use in the above applications.

It has also been found that 2-ethoxyethyl 2,5-diiodobenzoate has relatively poor heat and processing stability. High extruder screw speeds and high die temperatures are required to make tubing with glass-smooth surfaces for easy placement in the body. Many of the 2,5-diiodoester compositions decompose after only about 3 to 4 hours in the extruder resulting in frequent breakdowns in the continuous tubing extrusion processes and a high percentage of waste. If the extrusion temperature is lowered to overcome these problems, the tubing surface becomes rough and painful on insertion.

The 2-ethoxyethyl 2,5-diiodobenzoate commercial embodiment of U.S. 3,361,700 has been found also to suffer from exudation at concentrations of 40 to 50% by weight of the composition. This exudation is a special problem at high humidities. Exudation of the 2,5-diiodoester is so pronounced as to make it clinically unattractive for use as a plasticizer-radiopacifier in stomach and nasal tubes.

Apart from the exudation problem, because of the high plasticization value of the 2,5-diiodoester at 40–50% concentrations, it is not possible to meet modulus specifications necessary to insure that the products possess the required balance between flexibility and stiffness.

In this connection, it is observed that the commercially practiced loadings of 25–32% of the 2,5-diiodoester provides tubings with minimum tensile break strengths of from 1.4 to 8.5 pounds, the higher values being obtained at greatest wall thickness. The specifications require 8.5 pounds minimum—so the marginal behavior is evident at loadings which still leave a lot to be desired in terms of radiopacity. Increasing the loadings to 40 to 50% causes tensile break strengths to fall significantly below the specifications for intubation sets. They are also too limp for use.

In the said prior applications Ser. Nos. 518,186 and 571,592, it is disclosed that certain higher iodinated forms of benzoic acid esters possess dual vinyl resin plasticization and radiopacification properties.

It is surprising to find this combination of properties in such compounds in view of the disclosure in U.S. 3,361,-700 to the effect that the triiodo analogs of the diiodo compounds are devoid of plasticizing properties.

In applications Serial Nos. 518,186 and 571,592 certain tetraiodo benzoic acid esters, in particular, n-butyl 2,3,4,6-tetraiodobenzoate and 2-ethoxyethyl 2,3,4,6-tetraiodobenzoate, are disclosed to be capable of being incorporated into vinyl plastics. The novel compositions are disclosed to have a very high degree of radiopacity without impaired physical properties.

In the said prior application Ser. No. 826,778, a further unexpected advance in this art is disclosed. It is disclosed that a combination of certain tetraiodobenzoate esters with the diiodo esters of U.S. 3,361,700 provides plasticization and radiopacification in a surprisingly efficient manner. In comparison with compositions of the patent containing the 2,5-diiodobenzoate alone, for example, the compositions of Ser. No. 826,778 are smoother, have improved clarity, heat stability and processability and easily meet the physical specifications for catheters. Most significantly, they have a dramatic improvement in radiopacity. Furthermore, by balancing numerous combinations of di-iodo and tetraiodo compounds, there are provided compositions in a wide range of stiffness and flexibility.

In all of the prior applications the tubing prepared from the new combinations is composite. Composite tubing includes an inner tube and an outer shell of different compositions to give the required strength to withstand twisting. It has now been found that such strength can be achieved wtih the former and the present compositions in single wall tubing, thus eliminating the need to use complicated bi-orifice tubular dies and to mix two formulations—one for the inner tube and one for the outer shell.

It has now also been found that a family of alkyl diiodobenzoate esters will provide the desired improved plasticization and radiopacification, when used alone, or in admixture with the alkyl or alkoxyalkyl tetraiodobenzoates of the said prior applications and will even overcome the deficiencies of the alkoxyalkyl diiodobenzoates of U.S. 3,361,700 when mixed with them.

It has also been found that many of the new compositions have a negligible tendency to exude the iodo compounds at high concentrations on aging, even at high humidities.

It is, accordingly, a primary object of the invention to provide improved plasticized radiopaque vinyl resin compositions.

It is another object of this invention to provide vinyl resin compositions with high iodine content, and with a wide range of flexibility in numerous sizes.

It is a further object of this invention to provide improved radiopaque medical-surgical tubing and stomach tubes, nasal tubes, thoracic catheters, and the like.

Still another object of this invention is to provide single wall radiopaque medical-surgical tubing with physical properties adequate to meet specifications for intubation sets and catheter needles.

Still another object of this invention is to provide radiopaque plasticized vinyl compositions which have improved heat and processing stability.

Another object of this invention is to provide radiopaque plasticized vinyl compositions which can be extruded into medical-surgical tubings which have higher radiopacity, are smoother, and have improved clarity while still meeting the physical specifications for intubation sets and catheter needles.

A further object of this invention is to provide compositions from which the plasticizer-radiopacifier does not exude at high concentrations.

Another object of this invention is to provide compositions from which medical-surgical tubing with heavy stiff walls with high radiopacity can be prepared for use in ureteral and heart catheters.

DESCRIPTION OF THE INVENTION

The foregoing objects and advantages and others readily apparent to those skilled in the art are provided by the ureteral and heart catheters.

According to this invention there are provided compositions and shaped articles prepared therefrom, such as medical-surgical tubing, the compositions comprising a vinyl resin and, as a plasticizer-radiopacifier therefor, a compound selected from those of Formula I

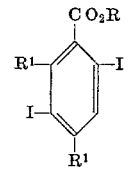

(I)

wherein:

$R^1$ is hydrogen or iodo;
R is alkyl when each $R^1$ is hydrogen; and
R is alkyl or alkoxyalkyl when each $R^1$ is iodo and mixtures of such compounds.

When used herein and in the appended claims the term "alkyl" contemplates hydrocarbon groups containing from about 1 to about 12 carbon atoms, straight chain and branched. Illustrative of such groups are methyl, ethyl, n-propyl, i-propyl, n-butyl, t-butyl, n-hexyl, 2-ethylhexyl, n-decyl, n-dodecyl and the like.

The term "alkoxyalkyl" contemplates groups containing up to a total of 12 carbon atoms, straight and branched chain, with a maximum of about 6 carbon atoms each in the alkylene chain and in the alkoxy substituent. Illustrative of such groups are 2-ethoxyethyl, 2-butoxyethyl, 3-ethoxypropyl, 3-ethoxy-2-methylpropyl, 6-n-hexoxy-n-hexyl and the like. The term "(lower) alkyl" includes groups having from 1 to 6 carbon atoms, illustrated above and preferably methyl, ethyl, n-propyl and n-butyl. The term "(lower)alkoxy(lower)alkyl" includes groups having from 3 to 6 carbon atoms, total, illustrated above and preferably methoxyethyl, 2-ethoxyethyl and 2-butoxyethyl.

The term "vinyl resin" contemplates a family of thermoplastic resinous materials consisting of polymers and copolymers of vinyl compounds. The nature of the resin is not particularly critical—so long as it is compatible with the plasticizer-opacifier of Formula I and is suitable for medical use. Especially suitable are polymers and copolymers of halogenated vinyl monomers, e.g., vinyl chloride, vinylidene chloride, and vinyl esters such as polyvinyl acetate, as well as copolymers of such monomers with vinyl butyral, polyvinyl alcohol, alkyl vinyl ethers, and the like. The preferred resins will be homopolymers of vinyl chloride and copolymers of vinyl chloride with a minor proportion, e.g., from about 5 to 20 wt. percent, and especially about 10-15 wt. percent of vinyl acetate. These generally are the vinyl resins most easily compatible with the compounds of Formula I.

Special mention is made of a number of preferred embodiments of this invention.

A particularly useful subgeneric aspect is provided by forming compositions and medical-surgical tubing containing as plasticizer-opacifier, a compound of Formula I wherein each $R^1$ is hydrogen and R is (lower)alkyl, especially methyl 2,5-diiodobenzoate and n-propyl 2,5-diiodobenzoate.

As will be shown, an unusual range of combination of properties is obtained in the compositions and medical-surgical tubing prepared therefrom if the plasticizer-radiopacifier comprises a mixture of n-propyl 2,5-diiodobenzoate and methyl 2,5-diiodobenzoate.

Another particular useful subgeneric aspect comprises compositions and medical-surgical tubing containing the tetraiodo compounds of Formula I, i.e., those wherein each $R^1$ is iodo and R is (lower)alkyl or (lower-alkoxy-(lower)alkyl, especially n-butyl 2,3,4,6-tetraiodobenzoate.

An unusual combination of properties will also be obtained in the compositions and medical-surgical tubing prepared therefrom if the plasticizer-opacifier comprises a mixture of n-butyl 2,3,4,6-tetraiodobenzoate and n-propyl 2,5-diiodobenzoate.

As has been mentioned, the shortcomings of the alkoxyalkyl diiodobenzoates of U.S. 3,361,700 can be overcome by mixing them with a plasticizer-opacifier of Formula I. Therefore, useful embodiments of this invention include a composition and medical-surgical tubing prepared therefrom comprising a vinyl resin, a compound of Formula I and at least one additional alkoxyalkyl diiodobenzoate compound of Formula II

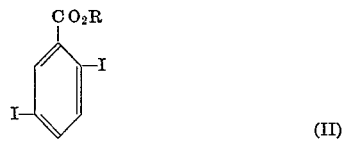

wherein R is alkoxyalkyl, preferably (lower)alkoxy(lower)alkyl, and mixtures of such compounds. A particular embodiment uses 2-ethoxyethyl 2,5-diiodobenzoate as the additional compound.

The compositions are prepared and converted into useful products by techniques well known to those skilled in the art.

In one manner of proceeding, the fluid ingredients, e.g., radiopaque plasticizer, if liquid, radioparent plasticizer, and vinyl resin stabilizer, if used, are mixed in a suitable mixer, e.g., a Hobart-type planetary mixer, until blended, then the powdered solids, e.g., vinyl resin and plasticizer, if solid, are added.

After thorough blending, the mass can be fused and mixed under pressure, e.g., in a Banbury-type mixer—a single cycle is satisfactory—and discharged. Conventional 2-roll compounding methods can also be used.

The composition next can be cooled and granulated.

If extrusions are to be made, the granulated composition can be fed to a conventional machine, for example, a 30 millimeter Reifenhausen-type single screw extruder operated at suitable temperature, e.g., 280–330° F. and the tubing or other shapes formed at a suitable rate. e.g., 7,000–10,000 feet per hour and cut automatically to length.

In preparing the compositions, according to techniques known to those skilled in the art, various additional ingredients such as plasticizers, stabilizers, lubricants, fillers, pigments and the like may be added to secure advantages desired and expected in any vinyl resin formulation.

In embodiments of this invention, for example, the composition and medical-surgical tubing prepared therefrom will include a minor proportion, e.g., from 1 to 20% by weight, of a radioparent, i.e., conventional, X-ray transparent, plasticizer and a minor proportion, e.g., from 0.5 to 5% by weight, of a heat stabilizer, both based on weight of total composition.

The radioparent, conventional plasticizer will be employed to impart flexibility, often more economically than can be achieved with the polyiodo compounds alone. Suitable radioparent plasticizers are high boiling liquid esters, for example, dialkyl esters of aromatic and aliphatic polybasic acids, such as phthalates, adipates, sebacates and azelates, e.g., dioctyl phthalate, dioctyl adipate, di-2-ethylhexyl azelate, dibutyl sebacate and the like. These are all commercially available. For example, dioctyl adipate is available from Rohm and Haas Company under the name Monoplex DIOA.

Epoxy plasticizers too are very useful as radioparent plasticizers since they also help to stabilize the resin. Epoxidized soy bean oil, epoxidized triglycerides and the like are illustrative.

One such epoxy plasticizer is Epoxol 9–5, commercially available from Swift Chemical Company. It is an epoxidized triglyceride with good resistance to heat and light and has a minimum 9% oxirane content. The specific gravity at 25° C. is 1.020 and the flash point is 320° C.

Heat stabilizers for vinyl resins are well known to those skilled in the art. These are metallic salts—some solid, some liquid—based on tin, calcium and zinc. Epoxy plasticizers are often used with them for a synergistic effect. For medical use, calcium and zinc in limited amounts are preferred for their low toxicity, and can be used with epoxies.

One such calcium zinc stabilizer is a fluid paste containing non-toxic compounds of calcium and zinc. It is white and is insoluble in most common solvents and plasticizers. It is commercially available from Advance Division of Carlisle Chemical Works, Inc., under designation CZ–11C.

Some formulations will be aided by inclusion of small amounts of lubricants such as metallic stearate, stearic acid, paraffinic wax, mineral oil and the like, for processability.

With respect to the amounts of plasticizer-radiopacifier to be used in the present compositions, those skilled in the art will understand that the properties of all flexible vinyl resin compounds are, within practicable limits, tailor made to fit application requirements. Various compromises and adjustments are made when using plasticizers to obtain the best combination of physical properties. Therefore, the lower limit will be established as the least amount of plasticizer-radiopacifier needed to impart the desired degree of plasticization and radiopacification to the composition. This will be about 10% by weight based on total composition. The upper limit will be the amount which, in each case, may not be exceeded without overplasticizing the composition for the intended use. This will be about 70% by weight based on total composition. In this connection, an upper limit for radiopacity is not significant. With these factors in mind, preferred compositions are those wherein the plasticizer-radiopacifier of Formula I is present in an amount to provide from about 20 to about 50% by weight of the total weight of composition.

In those embodiments wherein there is used a mixture of the alkyl diiodobenzoates or the alkyl or alkoxyalkyl tetraiodobenzoates of Formula I and the alkoxyalkyl diiodobenzoates of Formula II, the preferred compositions will comprise from about 20 to 50% by weight of the compounds together, of which no more than about 35% will be the compound of Formula II.

Likewise, when using mixtures of the plasticizer-radiopacifiers of Formulae I and II, the properties of the compositions are, within practicable limits, tailor made to fit the application requirements, using flexibility, modulus, and radiopacity as guides. The numerous working examples in this disclosure will indicate how the properties of the compounds can be varied by using the plasticizer-radiopacifier in admixture.

In general, the basic element in the formulation seems to be that esters have plasticizer value in relation to the number of iodine atoms in the structure. Where different structures have the same number of iodine atoms their plasticizer values vary inversely with their weight percentages of iodine. Alone or in combination, they are useful if liquid at room temperature or, if solid, when compatible with the other esters in the blend.

It has also been found that in general the melting point of the solid benzoic acid esters bears an inverse relationship to their value as plasticizers. The higher the melting point, the lower the plasticizing value.

The plasticizer-radiopacifier compounds of Formula I used in this invention can be prepared by treating a 2,3,4,6-tetraiodobenzoyl halide or 2,5-diiodobenzoyl halide of Formula III with an alkanol or alkoxyalkanol of Formula IV according to the following:

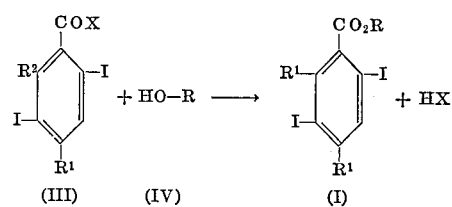

wherein:

R¹ is hydrogen or iodo and
R is alkyl or alkoxyalkyl and
X is halogen, preferably chlorine.

Equimolar quantities or an excess of alkanol or alkoxyalkanol can be used, and the reaction takes place at ordinary temperatures. Heat may be used to speed up the reaction and an acid acceptor such as pyridine is useful too. An inert solvent, such as benzene or chloroform, can be used but it is not necessary.

The following procedures illustrate the preparation of some plasticizer-radiopacifiers used in making the compositions of this invention.

PREPARATION A

Methyl 2,5-diiodobenzoate 2,5-diiodobenzoic acid (3.16 kg., Singh et al., J. Sci. Ind. Res. V, 9B, 27 (1950)), 2.5 l. of chloroform and 2 l. of thionyl chloride are refluxed for 3 hours. Excess thionyl chloride and chloroform are distilled off. Methyl alcohol, 2.5 l., is added slowly to the cold acid chloride. The mixture is refluxed for 4 hours and then allowed to cool. The solid product is filtered off and washed with a small quantity of methyl alcohol. The product is dissolved in petroleum ether (B.P., 60–80° C.), treated with charcoal, filtered and allowed to crystallize, M.P., 75–76° C.

PREPARATION B n-Propyl 2,5-diiodobenzoate

Preparation A is repeated substituting 2.5 l. of n-propyl alcohol for the methyl alcohol. The crude product is poured into water. The organic layer is washed with water, sodium bicarbonate solution and with water. The organic phase is dried over anhydrous sodium sulfate. The product is distilled at 130° C., 50 microns' pressure, to provide a golden colored liquid. Crystallization is made from n-propyl alcohol; M.P., 25–28° C.

By replacing the n-propyl alcohol in Procedure B with a molar equivalent amount of ethanol, i-propanol, n-butanol, t-butanol, n-hexanol, 2-ethylhexanol, n-decanol and n-dodecanol, there can be obtained, respectively, ethyl 2,5-diiodbenzoate, i-propyl 2,5-diiodbenzoate, n-butyl 2,5-diiodobenzoate, t-butyl 2,5-diiodobenzoate, n-hexyl 2,5-diiodobenzoate, 2-ethylhexyl 2,5-diiodobenzoate, n-decyl 2,5-diiodobenzoate and n-dodecyl 2,5-diiodobenzoate.

PREPARATION C n-Butyl 2,3,4,6-tetraiodobenzoate

This compound is made by treating 2,3,4,6-tetraiodobenzoic acid with n-butyl p-toluenesulfonate in dry ethanol/sodium ethoxide according to Example II of U.K. Pat. No. 877,495. The product boils at 225–230° C., 0.1 mm.

In a similar fashion, there are prepared the corresponding methyl (MP., 151–152° C.), ethyl (M.P., 107.5–108.5° C.), n-propyl (M.P., 97–98° C.) and n-dodecyl (M.P., 61.5–63° C.) esters.

PREPARATION D

2-ethoxyethyl 2,3,4,6-tetraiodobenzoate 2,3,4,6-tetraiodobenzoyl chloride, prepared by treating the acid with phosphorus pentachloride and phosphorus oxychloride according to the procedure of Example IV of U.K. Pat. 877,495 is treated with a slight excess of 2-ethoxyethanol in dry benzene and refluxed for 3 hours and allowed to stand for 15 hours. The reaction mixture is concentrated, the residue is poured into water and extracted with ether. The ether extracts are washed, dried and evaporated to leave the product as a residue.

By replacing 2-ethoxyethanol with an equivalent amount of 2-n-butoxyethanol, 3-ethoxy-n-propanol, 3-ethoxy-2-methylpropanol, 6-n-hexoxy-n-hexanol, there can be obtained 2-n-butoxyethyl 2,3,4,6-tetraiodobenzoate, 3-ethoxy-n-propyl 2,3,4,6-tetraiodobenzoate, 3-ethoxy-2-methylpropyl 2,3,4,6-tetraiodobenzoate and 6-n-hexoxy-n-hexyl 2,3,4,6-tetraiodobenzoate.

DESCRIPTION OF THE PREFERRED EMBODIMENTS

The following examples will further illustrate the invention without limiting it.

As is pointed out above, the compositions of this invention can be used for many various and diverse purposes, e.g., protective sheeting, surgeon's gloves, intubation sets, heart catheters, stomach tubes, nasal tubes, thoracic catheters and the like. The following examples primarily illustrate the use of these compositions in the form of single and multiple wall surgical tubing. However, from the foregoing description and the following examples and by reference to other well known teachings, the methods and modes by which the plasticized radiopaque vinyl resin compositions of this invention can be formed into various other articles will be readily apparent to those skilled in the art.

The medical grade radiopaque tubing prepared as described in the following examples is non-toxic, non-reactive to tissue and may be sterilized by gas or cold sterilization solutions. The tubing is generally dispensed as such and the surgeon or trained technician will form it into catheters for roentgenography. For maximum convenience, the tubing can also be preformed into articles and dispensed, e.g., as sterile disposable catheter needles.

By way of illustration, catheters according to this invention will be fabricated from the medical-surgical tubing of the following examples by operations comprising tip forming, tip finishing, shaping, side hole forming, and flaring. Before use they will be sterilized.

Those skilled in the art will prepare a variety of tip shapes. For internal mammary and axillary artery branches a three-quarter loop is formed in the distal end. For percutaneous arteriography and cerebral arteriography via femoral, a 45–60° smooth bend will be formed in the distal end. Selective renal arteriography and celiac arteriography requires a one-half loop. Hepatic venography uses about a seven-eighths loop. For trans-septal left-heart catheterization via the femoral vein, a three-quarter loop, like that above-described for mammary branches, but larger, is formed. On the other hand, abdominal aortography via brachial artery uses a rather large, one-third closed loop and thoracic aortography via the femoral artery uses the same shape but bigger. For lumbar aortography via the femoral artery the tip is straight out. For coronary arteriography, the end of the catheter is looped.

The heavier-walled tubing of the following examples, e.g., Examples 23 and 24, is formed into such typical shapes by inserting a forming wire within the tubing and heating in a tiny flame until visibly softened. By pulling from both ends the tubing is drawn to the wire and forms a uniform lumen around it. The tip is formed by cutting, e.g., with a razor blade, at the drawn diameter and is smoothly rounded in the flame. Next a precurved wire is inserted into the tube which is then immersed in hot water until the tubing softens. Quenching in cold water will cause the catheter to conform to the curve of the forming wire. Side hole or eye punching is accomplished by rotating a sharpened hole punch cannula under slight pressure. The holes should be large enough to expel contrast media without excessive build up of injection pressures but should be no larger than ⅔ of the internal diameter of the tubing. The catheter is cut to the preselected length and flared. Heating in a small flame and rotating on a flaring tool produces a flare of the desired size. The catheter can be bonded at the flare, e.g., with epoxy cement, to a suitable hub. On the other hand, an adapter can be used to screw the catheter to a Luer-Lok stopcock, or the like.

EXAMPLE 1

The following formulation is prepared.

| Constituents: | Parts by wt. |
|---|---|
| Resin, polyvinyl chloride Diamond Plastics, PVC 500 | 66.9 |
| n-Propyl 2,5-diiodobenzoate | 26.6 |
| Epoxy plasticizer, Swift and Co., Epoxol 9-5 | 4.8 |
| Calcium zinc stabilizer, Advance Div., Carlisle Chemical Works, Inc., CZ 11C | 1.0 |
| Mineral oil | 0.6 |
| | 99.9 |

The fluids are mixed in a planetary mixer, e.g., a Hobart mixer, for 15 minutes. The powdered ingredients are added and mixed for 1.5 hours. The mixture is fluxed and mixed in a Banbury—one 10-15 min. cycle—and discharged. The partially cooled mass is granulated through ⅛ in. or ¼ in. screen. The granulated product is extruded in a 30 mm. Reinfenhauser single screw extruder at 280–330° F. at 7,000–10,000 feet per hour into medical-surgical tubing, 0.065 O.D. x 0.046 I.D.—wall 0.010 exceeding minimum specifications of tensile break strength, elongation and flexural strength for use as intubation sets and in catheter needles.

The tensile strength at break averages 9.1 pounds (Scott tester); specifications are 8.5 p.s.i. minimum. Elongation is 300% (2 inch span becomes 6 inches at break). The surface is smooth and slightly satiny. The color is almost water white. Radiopacity in excellent. In this size, the composition and tubings are useful in intubation sets. Intubation sets are inserted into hollow organs, such as arteries or the trachea, to keep the organs open.

EXAMPLE 2

The procedure of Example 1 is repeated with the following formulation.

| Constituents: | Parts by wt. |
|---|---|
| Resin, polyvinyl chloride, Escambia Corp., ESC 3225 | 66.9 |
| n-Propyl 2,5-diiodobenzoate | 26.6 |
| Epoxy plasticizer, Epoxol 9-5 | 4.8 |
| Calcium zinc stabilizer, CZ 11C | 1.0 |
| Mineral oil | 0.6 |
| | 99.9 |

The medical-surgical tubing has tensile strength at break of 8.8 pounds. The surface is smooth and glassy. The color is water white. Radiopacity is excellent. In this size the composition and tubings are useful in intubation sets.

EXAMPLE 3

The procedure of Example 1 is repeated with the following formulation.

| Constituents: | Parts by wt. |
|---|---|
| Resin, polyvinyl chloride, Diamond Plastics, PVC 500 | 63.0 |
| n-Propyl 2,5-diiodobenzoate | 31.4 |
| Epoxy plasticizer, Epoxol 9-5 | 4.3 |
| Calcium zinc stabilizer, CZ 11C | 1.0 |
| Mineral oil | 0.3 |
| | 100.0 |

The medical-surgical tubing has a tensile strength at break of 9.2 pounds. The surface is smooth and slightly satiny. The color is almost water white. Radiopacity is excellent. In this size the composition and tubing are useful in intubation sets.

EXAMPLE 4

The procedure of Example 1 is repeated with the following formulation.

| Constituents: | Parts by wt. |
|---|---|
| Resin, polyvinyl chloride, Escambia Corp., ESC 3225 | 63.0 |
| n-Propyl 2,5-diisodobenzoate | 31.4 |
| Epoxy plasticizer, Epoxol 9-5 | 4.3 |
| Calcium zinc stabilizer, CZ 11C | 1.0 |
| Mineral oil | 0.3 |
| | 100.0 |

The medical-surgical tubing has a tensile strength at break of 8.6 pounds. The surface is smooth, but satiny, The color is very pale yellow. Radiopacity is good. In this size the composition and tubing are useful in intubation sets.

EXAMPLE 5

The procedure of Example 1 is repeated with the following formulation.

| Constituents: | Parts by wt. |
|---|---|
| Resin, polyvinyl chloride, Uniroyal, Inc., Mar VR–12 | 67.8 |
| n-Propyl 2,5-diiodobenzoate | 25.7 |
| Epoxy plasticizer, Epoxol 9-5 | 4.9 |
| Calcium zinc stabilizer, CZ 11C | 1.0 |
| Mineral oil | 0.6 |
| | 100.0 |

The medical-surgical tubing has a tensile strength at break of 8.7 pounds. The surface is slightly satiny. The color is very pale yellow and slightly hazy. Radiopacity is good. In this size the composition and tubing are useful in intubation sets.

EXAMPLE 6

The procedure of Example 1 is repeated with the following formulation.

| Constituents: | Parts by wt. |
|---|---|
| Resin, polyvinyl chloride, ESC 3225 | 65.5 |
| n-Propyl 2,5-diiodobenzoate | 26.2 |
| Epoxy plasticizer, Epoxol 9-5 | 7.1 |
| Calcium zinc stabilizer, CZ 11C | 1.0 |
| | 99.9 |

The medical-surgical tubing has a tensile strength at break of 9.0 pounds. The surface is smooth and glassy. The color is water white. Flexibility is excellent. Radiopacity is good. In this size the compositions and tubing are useful in intubation sets.

The foregoing six examples show that n-propyl 2,5-diiodobenzoate can be extruded in different vinyl compositions with excellent results. Some contain high concentrations, about 31 wt. percent, and some have low concentrations, about 26 wt. percent, of this plasticizer-radiopacifier. All have excellent extrusion characteristics and processability.

For comparison purposes, two formulations are made using 2-ethoxyethyl 2,5-diiodobenzoate according to the disclosure in U.S. 3,361,700.

| Constituents: | Parts by wt. |
|---|---|
| Resin, polyvinyl chloride, Marvinol VR–12 | 69.0 |
| 2-ethoxyethyl 2,5-diiodobenzoate | 25.0 |
| Epoxy plasticizer, Epoxol 9-5 | 4.0 |
| Calcium zinc stabilizer, CZ 11C | 1.0 |
| Mineral oil | 1.0 |
| | 100.0 |

The tubing has a tensile strength at break of 4.0 pounds (0.027–0.031 I.D. x 0.042–0.046 O.D.); 6.5 pounds (0.044–0.048 ID x 0.079–0.083 O.D.); and 8.5 pounds (0.066–0.070 I.D. x 0.088–0.092 O.D.). The surface is rough. The color is yellow and cloudy. Radiopacity is poor.

| Constituents: | Parts by wt. |
|---|---|
| Resin, polyvinyl chloride, Marvinol VR–12 | 65.0 |
| 2-ethoxyethyl 2,5-diiodobenzoate | 30.0 |
| Epoxy plasticizer, Epoxol 9–5 | 4.0 |
| Calcium zinc stabilizer, CZ 11C | 1.0 |
| | 100.0 |

The tubing has a tensile strength at break of 6.5 pounds (0.044–0.048 I.D. x 0.064–0.068 O.D.). The surface is rough. The color is yellow and cloudy. Radiopacity is poor.

The foregoing two formulations show the disadvantages of the prior art compositions, i.e., poor heat stability, poor processability, lack of clarity, lack of adequate tensile strength and poor radiopacity.

The following Examples 7–11 are compositions prepared by using alkyl 2,5-diiodobenzoates in admixture. It will be seen that these blends provide compositions with improved results over those of U.S. 3,361,700.

EXAMPLE 7

The procedure of Example 1 is repeated with the following formulation.

| Constituents: | Parts by wt. |
|---|---|
| Resin, polyvinyl chloride, Escambia 3225 | 61.8 |
| n-Propyl 2,5-diiodobenzoate | 22.4 |
| Methyl 2,5-diiodobenzoate | 11.2 |
| Epoxy plasticizer, Epoxol 9–5 | 3.8 |
| Calcium zinc stabilizer, CZ 11C | 0.9 |
| | 99.9 |

The medical-surgical tubing has a tensile strength at break of 8.2 pounds. It is glassy smooth and almost water white. Radiopacity is excellent. At this size the composition and tubing are useful for intubation sets and the larger sizes of heavy wall heart or ureteral catheters.

EXAMPLE 8

The procedure of Example 1 is repeated with the following formulation.

| Constituents: | Parts by wt. |
|---|---|
| Resin, polyvinyl chloride, Diamond No. 500 | 61.8 |
| n-Propyl 2,5-diiodobenzoate | 22.4 |
| Methyl 2,5-diiodobenzoate | 11.2 |
| Epoxy plasticizer, Epoxol 9–5 | 3.8 |
| Calcium zinc stabilizer, CZ 11C | 0.9 |
| | 100.1 |

The medical-surgical tubing has a tensile strength at break of 9.3 pounds. It is smooth and glassy, and almost water white. Radiopacity is excellent. At this size the composition and tubing are useful for intubation sets and the larger sizes of heavy wall heart or ureteral catheters.

EXAMPLE 9

The procedure of Example 1 is repeated with the following formulation.

| Constituents: | Parts by wt. |
|---|---|
| Resin, polyvinyl chloride, Escambia No. 3225 | 30.9 |
| Polyvinyl chloride, Diamond No. 500 | 30.9 |
| n-Propyl 2,5-diiodobenzoate | 22.4 |
| Methyl 2,5-diiodobenzoate | 11.2 |
| Epoxy plasticizer, Epoxol 9–5 | 3.8 |
| Calcium zinc stabilizer, CZ 11C | 0.9 |
| | 100.1 |

The medical-surgical tubing has a tensile strength at break of 8.5 pounds. It is glassy smooth and almost water white. Radiopacity is excellent. At this size the composition and tubing are useful for intubation sets and the larger sizes of heavy wall heart or ureteral catheters.

EXAMPLE 10

The procedure of Example 1 is repeated with the following formulation.

| Constituents: | Parts by wt. |
|---|---|
| Resin, polyvinyl chloride, Diamond No. 500 | 65.4 |
| n-Propyl 2,5-diiodobenzoate | 20.0 |
| Methyl 2,5-diiodobenzoate | 9.4 |
| Epoxy plasticizer, Epoxol 9–5 | 4.0 |
| Calcium zinc stabilizer, CZ 11C | 1.0 |
| | 99.8 |

The medical-surgical tubing has a tensile strength of 10.1 pounds. It is glassy smooth and almost water white. Radiopacity is excellent. At this size the composition and tubing are useful for intubation sets.

EXAMPLE 11

The procedure of Example 1 is repeated with the following formulation.

| Constituents: | Parts by wt. |
|---|---|
| Resin, polyvinyl chloride, Escambia 3225 | 67.5 |
| n-Propyl 2,5-diiodobenzoate | 18.3 |
| Methyl 2,5-diiodobenzoate | 9.2 |
| Epoxy plasticizer, Epoxol 9–5 | 4.2 |
| Calcium zinc stabilizer, CZ 11C | 1.0 |
| | 100.2 |

The medical-surgical tubing has a tensile strength at break of 9.2 pounds. It is glassy smooth and almost water white. Radiopacity is excellent. At this size the composition and tubing are useful for intubation sets.

The following example describes a composition containing a plasticizer-radiopacifier which is a mixture of a tetraiodo ester and one of the diiodo esters used in some of the foregoing examples.

EXAMPLE 12

The procedure of Example 1 is repeated with the following formulation.

| Constituents: | Parts by wt. |
|---|---|
| Resin, polyvinyl chloride, Escambia 3225 | 55.0 |
| n-Butyl 2,3,4,6-tetraiodobenzoate | 27.5 |
| n-Propyl 2,5-diiodobenzoate | 11.0 |
| Epoxy plasticizer, Epoxol 9–5 | 5.5 |
| Calcium zinc stabilizer, CZ 11C | 1.0 |
| | 100.0 |

The medical-surgical tubing is glassy smooth, clear, but slightly yellow. Radiopacity is outstanding. At this size the composition and tubing are useful for intubation sets and for heavy wall, intermediate size, 6–9 French, ureteral or heart catheters.

The following two examples describe compositions in which a tetraiodobenzoate is used in admixture with an alkoxyalkyl 2,5-diiodobenzoate of U.S. 3,361,700.

EXAMPLE 13

The procedure of Example 1 is repeated using the following formulation.

| Constituents: | Parts by wt. |
|---|---|
| Resin, polyvinyl chloride, Escambia 3225 | 61.4 |
| n-Butyl 2,3,4,6-tetraiodobenzoate | 11.1 |
| 2-ethoxyethyl 2,5-diiodobenzoate | 22.2 |
| Epoxy plasticizer, Epoxol 9–5 | 3.8 |
| Calcium zinc stabilizer, CZ 11C | 1.0 |
| Mineral oil | 0.6 |
| | 100.1 |

Medical-surgical tubing prepared from this composition possessed the excellent properties shown by those of Examples 7–11 and, in addition, they had improved radiopacity. The composition and tubing are useful for intubation sets in this size and in intermediate size heavy wall ureter and heart catheters.

EXAMPLE 14

The procedure of Example 1 is repeated with the following formulation.

| Constituents: | Parts by wt. |
|---|---|
| Resin, polyvinyl chloride, Escambia 3250 | 55.0 |
| n-Butyl 2,3,4,6-tetraiodobenzoate | 32.9 |
| 2-ethoxyethyl 2,5-diiodobenzoate | 5.5 |
| Epoxidized soybean oil | 4.4 |
| Calcium stabilizer, Advance Div., Carlisle Chemical Works, Inc., CH–55 | 1.6 |
| Mineral oil | 0.6 |
| Fumed silica, Cabot Corp., Cab-o-sil | 0.3 |
| | 100.3 |

Medical-surgical tubing processes easily from this formulation and has excellent opacity—equivalent to that of Example 12. The tubing is glassy smooth, but because of the presence of Cab-o-sil, it has slightly inferior clarity. This formulation is useful for smaller sizes of intubation sets and also for large size heavy wall heart catheters.

EXAMPLE 15

The procedure of Example 1 is repeated with the following formulation.

| Constituents: | Parts by wt. |
|---|---|
| Resin, polyvinyl chloride, Escambia 3225 | 63.0 |
| Methyl 2,5-diiodobenzoate | 31.5 |
| Epoxy plasticizer, Epoxol 9–5 | 4.3 |
| Calcium zinc stabilizer | 1.1 |
| | 99.9 |

Medical-surgical tubing prepared from this composition is pale tan and smooth. Radiopacity is excellent. The formulation and tubing are useful for intubation sets and intermediate size heavy wall ureteral and heart catheters.

EXAMPLE 16

The procedure of Example 1 is repeated with the following formulation.

| Constituents: | Parts by wt. |
|---|---|
| Resin, polyvinyl chloride, Escambia 3225 | 61.2 |
| Methyl 2,5-diiodobenzoate | 33.0 |
| Epoxy plasticizer, Epoxol 9–5 | 4.2 |
| Calcium zinc stabilizer, CZ 11C | 1.0 |
| Mineral oil | 0.6 |
| | 100.0 |

The medical-surgical tubing has a tensile strength at break of 8.6 pounds. It is tan and satiny. Radiopacity is good. The composition and tubing are useful for intubation sets and intermediate size heavy wall ureteral and heart catheters.

EXAMPLE 17

The procedure of Example 1 is repeated with the following formulation.

| Constituents: | Parts by wt. |
|---|---|
| Resin, polyvinyl chloride, Diamond 500 | 61.5 |
| Methyl 2,5-diiodobenzoate | 33.3 |
| Epoxy plasticizer, Epoxol 9–5 | 3.8 |
| Calcium zinc stabilizer, CZ 11C | 1.0 |
| Mineral oil | 0.6 |
| | 100.2 |

The medical-surgical tubing has a tensile strength at break of 8.7 pounds. It is satiny smooth and tan. Radiopacity is good. This composition and tubing can be used for intubation sets and heavy wall intermediate size ureteral and heart catheters.

EXAMPLE 18

The procedure of Example 1 is repeated with the following formulation.

| Constituents: | Parts by wt. |
|---|---|
| Resin, polyvinyl chloride, Escambia 3225 | 62.3 |
| Methyl 2,5-diiodobenzoate | 30.5 |
| Epoxidized soybean oil | 5.0 |
| Stabilizer, CH–55 | 1.2 |
| Mineral oil | 0.6 |
| Fused silica, Cab-o-sil | 0.3 |
| | 99.9 |

The medical-surgical tubing has a tensile strength at break of 8.5 pounds. It is light rose tan and satiny smooth. Radiopacity is excellent. This composition and tubing are useful for intubation sets and heavy wall intermediate size ureteral and heart catheters.

EXAMPLE 19

The procedure of Example 1 is repeated with the following formulation.

| Constituents: | Parts by wt. |
|---|---|
| Resin, polyvinyl chloride, Escambia 3225 | 63.3 |
| Methyl 2,5-diiodobenzoate | 29.1 |
| Epoxy plasticizer, Epoxol 9–5 | 7.2 |
| Calcium zinc stabilizer, CZ 11C | 1.0 |
| | 100.6 |

The medical-surgical tubing has a tensile srrength at break of 8.6 pounds. It is glassy smooth and very pale gold. Radiopacity is good. The composition and tubing are useful in intubation sets and heavy wall intermediate size ureteral and heart catheters.

EXAMPLE 20

The procedure of Example 1 is repeated with the following formulation.

| Constituents: | Parts by wt. |
|---|---|
| Resin, polyvinyl chloride, Escambia 3250 | 56.6 |
| n-Butyl 2,3,4,6-tetraiodobenzoate | 34.0 |
| Epoxidized soybean oil | 4.6 |
| Stabilizer, Advance, CH–55 | 1.1 |
| Epoxy plasticizer, Rohm and Haas Paraplex G–62 | 2.8 |
| Mineral oil | 0.5 |
| Fused silica, Cab-o-sil | 0.5 |
| | 100.1 |

The medical-surgical tubing has a tensile strength at break of 10.0 pounds. It is satiny smooth and pale rose tan. Radiopacity is excellent. This composition and tubing can be used for intubation sets and large sizes of heavy wall ureter and heart catheters.

EXAMPLE 21

The procedure of Example 1 is repeated with the following formulation.

| Constituents: | Parts by wt. |
|---|---|
| Resin, polyvinyl chloride, Escambia 3225 | 54.3 |
| n-Butyl 2,3,4,6-tetraiodobenzoate | 29.8 |
| Epoxy stabilizer, Paraplex G–62 | 9.5 |
| Epoxidized soybean oil | 4.3 |
| Stabilizer, Advance CH–55 | 1.1 |
| Mineral oil | 0.5 |
| Fused silica, Cab-o-sil | 0.5 |
| | 100.0 |

The medical-surgical tubing is glassy smooth, very flexible and almost water white. Radiopacity is good. The composition and tubing are useful for intubation sets and large sizes of heavy wall ureteral and heart catheters.

EXAMPLE 22

The procedure of Example 1 is repeated with the following formulation.

| Constituents: | Parts by wt. |
|---|---|
| Resin, polyvinyl chloride, Escambia 3225 | 52.4 |
| n-Butyl 2,3,4,6-tetraiodobenzoate | 37.8 |
| Epoxy plasticizer, Epoxol 9-5 | 8.4 |
| Calcium zinc stabilizer, CZ 11C | 1.4 |
| | 100.0 |

The medical-surgical tubing is pale gold, clear and glassy smooth. Radiopacity is excellent. This composition and tubing are useful for intubation sets and intermediate size heavy wall ureteral or heart catheters.

EXAMPLE 23

The procedure of Example 1 is repeated with the following formulation.

| Constituents: | Parts by wt. |
|---|---|
| Resin, polyvinyl chloride, Escambia 3225 | 49.4 |
| n-Butyl 2,3,4,6-tetraiodobenzoate | 37.0 |
| Epoxy plasticizer, Epoxol 9-5 | 12.3 |
| Calcium zinc stabilizer, CZ 11C | 1.5 |
| | 100.2 |

The medical-surgical tubing is light gold in color and glassy smooth. Radiopacity is excellent. This composition and tubing are useful for intubation sets and intermediate size heavy wall ureteral and heart catheters.

EXAMPLE 24

The procedure of Example 1 is repeated with the following formulation, changing the extrusion die to give tubing with 0.094 O.D. x 0.042 I.D. and 0.024 wall.

| Constituents: | Parts by wt. |
|---|---|
| Resin, polyvinyl chloride, Dow 100-4 | 55.0 |
| n-Butyl 2,3,4,6-tetraiodobenzoate | 39.6 |
| Epoxy plasticizer, Epoxol 9-5 | 3.9 |
| Calcium zinc stabilizer, CZ 11C | 1.5 |
| | 100.0 |

This formulation processes well and radiopacity is outstanding. The tubing is brown and satiny. The composition and tubing are useful in intermediate to small sizes of heart and ureteral catheters.

EXAMPLE 25

A double wall radiopaque vinyl medical-surgical tubing of 0.110 inch outer diameter and 0.071 inch inner diameter is extruded in a conventional manner employing a bi-orifice tubular die for co-extrusion of two concentric bonded tubings wherein the inner tube has a thickness of 0.0175 inch and the outer shell has a thickness of 0.002 inch.

The inner tube employs the following formulation.

| Constituents: | Parts by wt. |
|---|---|
| Resin, polyvinyl chloride, Dow Chemical Co., 100-4 | 48.8 |
| n-Butyl 2,3,4,6-tetraiodobenzoate | 36.5 |
| Radioparent plasticizer, dioctyl adipate | 9.8 |
| Epoxy plasticizer, Epoxol 9-5 | 3.9 |
| Calcium zinc stabilizer, CZ 11C | 1.0 |
| | 100.0 |

The outer shell employs the following formulation.

| Constituents: | Parts by wt. |
|---|---|
| Resin, polyvinyl chloride, Dow Chemical Co., 100-4 | 40.0 |
| n-Butyl 2,3,4,6-tetraiodobenzoate | 56.0 |
| Epoxy plasticizer, Epoxol 9-5 | 3.2 |
| Calcium zinc stabilizer, CZ 11C | 0.8 |
| | 100.0 |

This vinyl multi-wall medical-surgical tubing is found to have the described desired properties necessary for medical-surgical tubing.

EXAMPLE 26

A double wall radiopaque vinyl medical-surgical tubing particularly useful for thoracic, stomach and nasal use having an outer diameter of 0.348 inch and an inner diameter of 0.255 inch is extruded in a conventional manner, as in Example 24, employing a bi-orifice tubular die for co-extrusion of two concentric bonded tubings where the inner tube has a thickness of 0.039 inch and the outer jacket has a thickness of 0.0085 inch.

The inner tube employs the following formulation.

| Constituents: | Parts by wt. |
|---|---|
| Resin, polyvinyl chloride, Dow Chemical Co., 100-4 | 50.0 |
| Radioparent plasticizer, dioctyl phthalate | 33.0 |
| Epoxy plasticizer, Epoxol 9-5 | 15.0 |
| Calcium zinc stabilizer, CZ 11C | 2.0 |
| | 100.0 |

The outer jacket employs the following formulation.

| Constituents: | Parts by wt. |
|---|---|
| Resin, polyvinyl chloride, Dow Chemical Co., 100-4 | 55.4 |
| n-Propyl 2,5-diiodobenzoate | 38.8 |
| Epoxy plasticizer, Epoxol 9-5 | 5.0 |
| Calcium zinc stabilizer, CZ 11C | 0.9 |
| | 100.1 |

This multi-wall medical-surgical tubing has a slick, glass-like surface. It is pale rose tan and clear. Radiopacity is excellent. The composition and tubing are useful in this size for thoracic catheters.

It is to be understood that the foregoing Examples 25 and 26 are illustrative and do not limit the invention described herein. For example, the tubes and shells of such composites may comprise from about 40 to 60 parts polyvinyl chloride, from about 20 to 60 parts of compounds of Formulae I and II, from about 5 to 20 parts dioctyl adipate, from about 2 to 8 parts epoxy plasticizer and about 0.5 to 2 parts of calcium-zinc stabilizer compound per 100 parts of composition.

As is shown, composite medical-surgical tubings are made with the compositions of this invention, for example, by an extrusion procedure employing a bi-orifice tubular extrusion die of conventional design, having two concentric annular extrusion nozzles or orifices. The inner tube of plasticized vinyl material is extruded through the inner orifice. Correspondingly, the plastic containing radiopaque material for forming the shell is extruded through the outer orifice. Both layers of tubing are extruded from the orifice simultaneously under heat and pressure and because of the direction of discharge the inner and outer streams flow together and form a bonded multi-layer unit.

The medical-surgical tubing, as it is withdrawn from the extrusion die, can be immediately cut into proper lengths, or a continuous length of tubing can be formed from which tubings of desired length can subsequently be formed by cutting the continuous tubing at the desired points.

While the invention has been illustrated by describing in detail medical-surgical tubing having single or double walls, it is to be understood that items made with the compositions of the present invention are not limited thereto. For example, a triple wall, medical-surgical tubing may be desired for certain applications. In such instance the tubing could comprise a middle tube of a plastic containing a relatively high proportion of radiopaque-plasticizing substance wherein said middle tube provides the tubing with properties contributing, for example, to flexibility and maneuverability; an inner tube of a plastic material also containing a less amount of radiopaque-plasticizing substance, wherein said inner tube is stiffer to provide any desired shape retention properties for the tubing, particularly at elevated temperatures; and a thin outer shell of plastic containing only the non-plasticizing radiopaque pigment, wherein the shell provides the tubing with a hard and glass-like outer surface. Obviously each wall adds to the opacity of the tubing. The procedure for forming the triple wall tubing is similar to that for forming the double wall tubing previously described, except that a die having three concentric orifices is employed.

The invention in its broader aspects is not limited to the specific steps, methods, compositions described, but departures may be made therefrom within the scope of the accompanying claims without departing from the principles of the invention and without sacrificing its chief advantages.

What is claimed is:

1. A plasticized, radiopaque composition comprising a vinyl resin which is a polymer or copolymer of a halogenated vinyl monomer and a plasticizer-radiopacifier therefor consisting essentially of a compound selected from the group consisting of a diiodobenzoate or a tetraiodobenzoate of the formula

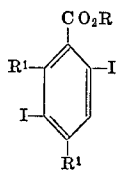

wherein
$R^1$ is hydrogen or iodo;
R is alkyl when each $R^1$ is hydrogen; and
R is alkyl or alkoxyalkyl when each $R^1$ is iodo and a mixture of said compounds, said plasticizer-radiopacifier comprising 20 to 50% by weight of the total composition.

2. A composition according to claim 1 which includes a minor proportion of a radioparent plasticizer and a minor proportion of a heat stabilizer for said vinyl resin.

3. A composition according to claim 1 wherein said vinyl resin is a homopolymer of vinyl chloride or a copolymer of vinyl chloride with a minor proportion of vinyl acetate.

4. A composition according to claim 1 wherein, in said plasticizer-radiopacifier, each $R^1$ is hydrogen and R is (lower)alkyl.

5. A composition according to claim 4 wherein said plasticizer-radiopacifier is methyl 2,5-diiodobenzoate.

6. A composition according to claim 4 wherein said plasticizer-radiopacifier is n-propyl 2,5-diiodobenzoate.

7. A composition according to claim 1 wherein, in said plasticizer-radiopacifier, each $R^1$ is iodo and R is (lower)alkyl or (lower)alkoxy(lower)alkyl.

8. A composition according to claim 7 wherein said plasticizer-radiopacifier is n-butyl 2,3,4,6-tetraiodobenzoate.

9. A composition according to claim 1 wherein the plasticizer-radiopacifier comprises a mixture of n-butyl 2,3,4,6-tetraiodobenzoate and n-propyl 2,5-diiodobenzoate.

10. A composition according to claim 1 wherein the plasticizer-radiopacifier comprises a mixture of n-propyl 2,5-diiodobenzoate and methyl 2,5-diiodobenzoate.

11. A composition according to claim 3 which includes at least one additional compound selected from the group consisting of those of the formula:

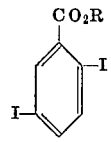

wherein R is alkoxyalkyl and mixtures thereof.

12. A composition according to claim 11 wherein said plasticizer-radiopacifier and said additional compound together comprise from 20 to 50% by weight of the composition.

13. A composition according to claim 11 wherein said additional compound is 2-ethoxyethyl 2,5-diiodobenzoate.

14. A composition according to claim 11 wherein said plasticizer - radiopacifier is n - butyl 2,3,4,6 - tetraiodobenzoate and said additional compound is 2-ethoxyethyl 2,5-diiodobenzoate.

15. Medical-surgical tubing comprising a radiopaque, plasticized vinyl resin which is a polymer or copolymer of a halogenated vinyl monomer and a plasticizer-radiopacifier therefor consisting essentially of a compound selected from the group consisting of a diiodobenzoate or a tetraiodobenzoate of the formula

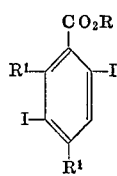

wherein
$R^1$ is hydrogen or iodo;
R is alkyl when each $R^1$ is hydrogen; and
R is alkyl or alkoxyalkyl when each $R^1$ is iodo and a mixture of such compounds, said plasticizer-radiopacifier comprising from 20 to 50% by weight of the total composition.

16. A medical-surgical catheter formed from the tubing of claim 15.

17. Medical-surgical tubing according to claim 15 which includes a minor proportion of a radioparent plasticizer and a minor proportion of a heat stabilizer for said vinyl resin.

18. Medical-surgical tubing according to claim 15 wherein said vinyl resin is a homopolymer of vinyl chloride or a copolymer of vinyl chloride with a minor proportion of vinyl acetate.

19. Medical-surgical tubing according to claim 16 wherein, in said plasticizer-radiopacifier, each $R^1$ is hydrogen and R is (lower)alkyl.

20. Medical-surgical tubing according to claim 19 wherein said plasticizer-radiopacifier is methyl 2,5-diiodobenzoate.

21. Medical-surgical tubing according to claim 19 wherein said plasticizer-radiopacifier is n-propyl 2,5-diiodobenzoate.

22. Medical-surgical tubing according to claim 16 wherein, in said plasticizer-radiopacifier, each $R^1$ is iodo and R is (loweralkyl or (lower)alkoxy(lower)alkyl.

23. Medical-surgical tubing according to claim 22 wherein said plasticizer-radiopacifier is n-butyl 2,3,4,6-tetraiodobenzoate.

24. Medical-surgical tubing according to claim 15 wherein the plasticizer-radiopacifier comprises a mixture of n-butyl 2,3,4,6-tetraiodobenzoate and n-propyl 2,5-diiodobenzoate.

25. Medical-surgical tubing according to claim 15 wherein the plasticizer-radiopacifier comprises a mixture of n-propyl 2,5-diiodobenzoate and methyl 2,5-diiodobenzoate.

26. Medical-surgical tubing according to claim 21 which includes at least one additional compound selected from the group consisting of those of the formula

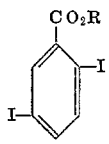

wherein R is alkoxyalkyl and mixtures thereof.

27. Medical-surgical tubing according to claim 26 wherein said plasticizer-radiopacifier and said additional compound together comprise from 20 to 50% by weight of the composition.

28. Medical-surgical tubing according to claim 26 wherein said additional compound is 2-ethoxyethyl 2,5-diiodobenzoate.

29. Medical-surgical tubing according to claim 26 wherein said plasticizer-radiopacifier is n-butyl 2,3,4,6-tetraiodobenzoate and said additional compound is 2-ethoxyethyl 2,5-diiodobenzoate.

References Cited

UNITED STATES PATENTS

| 2,403,794 | 7/1946 | Goldrick | 260—41 |
| 3,361,700 | 1/1968 | Archer | 260—31.4 |

FOREIGN PATENTS

| 739,509 | 7/1966 | Canada | 260—476 |
| 517,382 | 1/1940 | Great Britain. | |
| 877,495 | 9/1961 | Great Britain. | |

MORRIS LIEBMAN, Primary Examiner

P. R. MICHL, Assistant Examiner

U.S. Cl. X.R.

128—348; 260—31.2 R

UNITED STATES PATENT OFFICE
CERTIFICATE OF CORRECTION

Patent No. 3,645,955        Dated February 29, 1972

Inventor(s)   Vincent J. Flynn

It is certified that error appears in the above-identified patent and that said Letters Patent are hereby corrected as shown below:

Column 18, line 3, correct "3" to read -- 2 --; line 54 and 63 (both occurrences) correct "16" to read -- 15 --; line 64, correct "(loweralkyl" to read -- (lower)alkyl --; and Column 19, line 1, correct "21" to read -- 17 --.

Signed and sealed this 17th day of April 1973.

(SEAL)
Attest:

EDWARD M. FLETCHER, JR.
Attesting Officer

ROBERT GOTTSCHALK
Commissioner of Patent